United States Patent [19]

Hamilton

[11] Patent Number: 5,404,400
[45] Date of Patent: Apr. 4, 1995

[54] OUTCALLING APPARATUS

[75] Inventor: Chris A. Hamilton, Montclair, N.J.

[73] Assignee: Dialogic Corporation, Parsippany, N.J.

[21] Appl. No.: 24,402

[22] Filed: Mar. 1, 1993

[51] Int. Cl.6 ............................................. H04M 3/00
[52] U.S. Cl. ...................... 379/386; 379/92; 379/216; 379/127
[58] Field of Search ............... 379/92, 386, 88, 93, 379/127, 216, 100, 104, 69

[56] References Cited

U.S. PATENT DOCUMENTS

| | | | |
|---|---|---|---|
| 4,941,168 | 7/1990 | Kelly | 379/88 |
| 5,086,458 | 2/1992 | Bowen | 379/386 |
| 5,164,981 | 11/1992 | Mitchell et al. | 379/88 |
| 5,179,585 | 1/1993 | MacMillan et al. | 379/88 |
| 5,241,587 | 8/1993 | Horton et al. | 379/92 |

Primary Examiner—James L. Dwyer
Assistant Examiner—Jacques M. Saint-Surin
Attorney, Agent, or Firm—Michael B. Einschlag

[57] ABSTRACT

An embodiment of the present invention is an apparatus for placing a telephone call over a telephone line and for detecting whether the telephone call was answered by a live person, an answering machine, a facsimile machine, or a data apparatus such as a modem and, depending on the manner in which the telephone call was answered, for connecting: (a) either a human agent or a telephone dialogue application to the telephone line to speak to a live person; (b) a voice message delivery system to the telephone line to send a voice message to an answering machine; (c) a facsimile message delivery system to the telephone line to send a facsimile message to the facsimile machine; and (d) a data message delivery system to the telephone line to send a data message to the data machine.

14 Claims, 1 Drawing Sheet

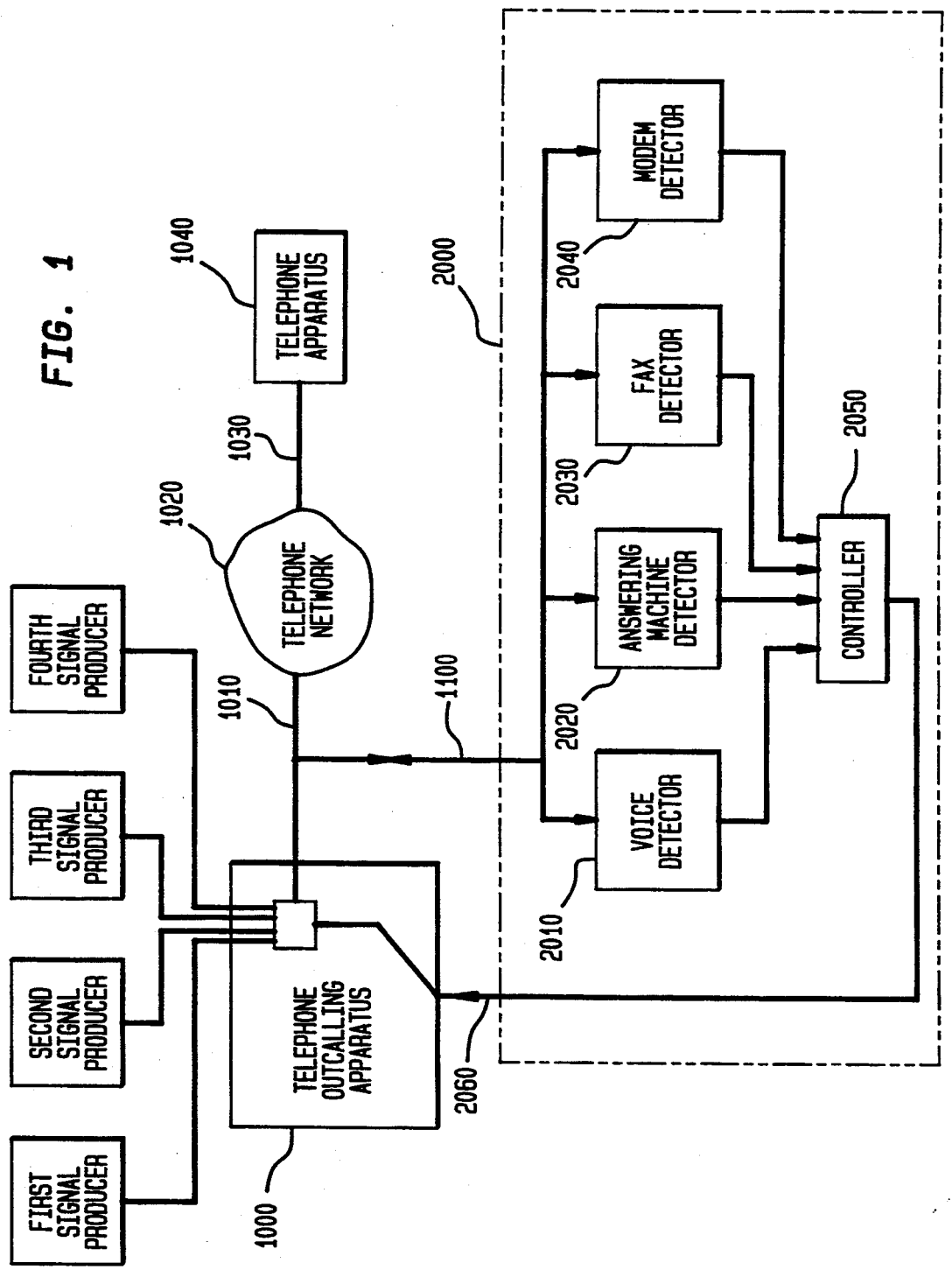

OUTCALLING APPARATUS

TECHNICAL FIELD OF THE INVENTION

The present invention pertains to the field of telephony and, in particular, to method and apparatus for outcalling, i.e., placing telephone calls.

BACKGROUND OF THE INVENTION

It is known in the art that automated systems have been developed for use in telecommunications applications wherein an automated system will place a telephone call for the purpose, for example, of connecting a business agent at one end with a member of the public at the other end. However, it is becoming increasingly more common for members of the public to utilize machines such as answering machines to respond to incoming calls for the purpose of screening calls, taking messages, blocking calls, and so forth. As those in the art readily appreciate, if the automated system connects a business agent to a machine, there is a great loss in efficiency in the use of the services of the business agent.

In addition, automated systems have been developed for use in telecommunications applications wherein an automated system will place a telephone call for the purpose, for example, of connecting an automated message delivery system at one end with a member of the public at the other end. However, if the telephone call is answered by an answering machine instead of a live person, the automated system will connect the automated message delivery system to a machine. Often this results in the message being garbled or lost.

In light of the above, there is a need in the art for an automated telephony system that can place a telephone call and communicate with the party who has been called in a manner which is suitable to that party. In particular, there is a need in the art for an automated telephony system that would: (a) place a telephone call, (b) detect the type of party that answers, and (c) provide a message in a form appropriate the type of party that answers. For example, there is a need for an automated system that would connect: (a) either a human agent or a telephone dialogue application to the telephone line to speak to a live person; (b) a voice message delivery system to the telephone line to send a voice message to an answering machine; (c) a facsimile message delivery system to the telephone line to send a facsimile message to the facsimile machine; and (d) a data message delivery system to the telephone line to send a data message to the data apparatus. Thus, there is a need in the art for method and apparatus for placing a telephone call and providing a message in voice form, facsimile form, data form, and so forth depending on the type of called party who responds to the telephone call.

SUMMARY OF THE INVENTION

Embodiments of the present invention advantageously solve the above-identified need in the art by providing method and apparatus for placing a telephone call and for detecting whether the telephone call was answered by a live person, an answering machine, a facsimile machine, or a data apparatus such as a modem and, depending on the manner in which the telephone call was answered, for connecting: (a) either a human agent or a telephone dialogue application to the telephone line to speak to a live person; (b) a voice message delivery system to the telephone line to send a voice message to an answering machine; (c) a facsimile message delivery system to the telephone line to send a facsimile message to the facsimile machine; and (d) a data message delivery system to the telephone line to send a data message to the data machine.

In particular, embodiments of the present invention comprise: (A) a telephone outcalling apparatus for placing a telephone call over a telephone line; (B) a voice detector: (a) for receiving telephone signals from the telephone line, (b) for detecting whether the telephone call was answered by a live person, and for generating a voice identification signal; (C) an answering machine detector: (a) for receiving telephone signals from the telephone line, (b) for detecting whether the telephone call was answered by an answering machine, and for generating an answering machine identification signal; (D) a fax detector: (a) for receiving signals from and sending signals to the telephone line, (b) for detecting whether the telephone call was answered by a facsimile machine, and for generating a fax identification signal; (E) a modem detector: (a) for receiving signals from and sending signals to the telephone line, (b) for detecting whether the telephone call was answered by a modem, and for generating a modem identification signal; (F) a controller, responsive to the voice, answering machine, fax, and modem identification signals, for transmitting an identification signal to the telephone outcalling application which indicates whether the telephone call was answered by a live person, an answering machine, a facsimile machine, or a modem; and (G) the telephone outcalling apparatus further comprising means, responsive to the identification signal, for connecting the telephone line to: (a) a first signal producing means if the identification signal indicates that the telephone call was answered by a live person; (b) a second signal producing means if the identification signal indicates that the telephone call was answered by an answering machine; (c) a third signal producing means if the identification signal indicates that the telephone call was answered by a facsimile machine; and (d) a fourth signal producing means if the identification signal indicates that the telephone call was answered by a modem.

BRIEF DESCRIPTION OF THE DRAWING

A complete understanding of the present invention may be gained by considering the following detailed description in conjunction with the accompanying drawing, in which:

FIG. 1 shows a block diagram of a preferred embodiment of an embodiment of the present invention for placing telephone calls.

DETAILED DESCRIPTION

FIG. 1 shows a block diagram of an embodiment of the present invention for placing a telephone call and for detecting whether the telephone call was answered by a live person, an answering machine, a facsimile machine, or a data apparatus such as a modem and, depending on the manner in which the telephone call was answered, for connecting: (a) either a human agent or a telephone dialogue application to the telephone line to speak to a live person; (b) a voice message delivery system to the telephone line to send a voice message to an answering machine; (c) a facsimile message delivery system to the telephone line to send a facsimile message to the facsimile machine; and (d) a data message delivery system to the telephone line to send a data message to the data machine. In particular, as shown in FIG. 1, telephone outcalling apparatus 1000 is connected to telephone line 1010, telephone line 1010 is connected to telephone network 1020, telephone network 1020 is connected to telephone line 1030, and telephone 1030 is connected to telephone apparatus 1040. Embodiments of telephone outcalling apparatus 1000 are well known to those of ordinary skill in the art. Such apparatus are well known for placing a telephone call to a called party and, if the called party is a live person, for connecting the called party: (a) to a business agent; (b) to a telephone dialogue application to provide messages to, and to receive input from, the live person; or (c) to a voice message delivery system to provide a message to the live person.

As further shown in FIG. 1, detection apparatus 2000 is also coupled by line 1100, in a manner which is well known to those of ordinary skill in the art, to telephone line 1010 for detecting telephone signals generated by telephone apparatus 1040 and/or persons which answer the telephone call placed to telephone apparatus 1040 and for sending signals to telephone apparatus 1040. Detection apparatus 2000 comprises voice detector 2010, answering machine detector 2020, fax detector 2030, and modem detector 2040. Voice detector 2010 receives telephone signals transmitted from telephone apparatus 1040 and determines whether a telephone call placed by telephone outcalling apparatus to telephone apparatus 1040 was answered by a live person. Answering machine detector 2020 receives telephone signals transmitted from telephone apparatus 1040 and determines whether a telephone call placed by telephone outcalling apparatus 1000 to telephone apparatus 1040 was answered by an answering machine. In a preferred embodiment of the present invention, an embodiment of voice detector 2010 and an embodiment of answering machine detector 2020 are fabricated in accordance with an invention described in a patent application entitled MACHINE ANSWER DETECTION, which patent application has the same inventor as this patent application, which patent application has been assigned to the assignee of this patent application, and which patent application is hereby incorporated herein by reference. Fax detector 2030 receives telephone signals transmitted from, and transmits telephone signals to, telephone apparatus 1040 and determines whether telephone apparatus 1040 is a facsimile machine. Embodiments of fax detector 2030 are well known to those of ordinary skill in the art. Modem detector 2040 receives telephone signals transmitted from, and transmits telephone signals to, telephone apparatus 1040 and determines whether telephone apparatus 1040 is a modem. Embodiments of modem detector 2040 are well known to those of ordinary skill in the art.

Voice detector 2010, answering machine detector 2020, fax detector 2030, and modem detector 2040 each sends a detection signal to controller 2050. In response, controller 2050 analyzes the detection signals received from voice detector 2010, answering machine detector 2020, fax detector 2030, and modem detector 2040, respectively, and transmits an identification signal 2060 to telephone outcalling apparatus 1000. Identification signal 2060 identifies whether the telephone call was answered by a live person, an answering machine, a facsimile machine, or a modem. Embodiments of controller 2050 may be fabricated using a microprocessor or a programmed computer in accordance with methods which are well known to those of ordinary skill in the art. In response to identification signal 2060, telephone outcalling apparatus 1000 connects to telephone line 1010: (a) a business agent, a telephone dialogue application, or a voice message delivery system if the telephone call was answered by a live person; (b) a voice message delivery system to send a voice message suitable for an answering machine if the telephone call was answered by an answering machine; (c) a facsimile message delivery system to send a facsimile message if the telephone call was answered by a facsimile machine; and (d) a data message delivery system if the telephone call was answered by a a modem. Embodiments of a telephone dialogue application, a voice message delivery system, a facsimile message delivery system, and a data message delivery system are well known to those of ordinary skill in the art. Further, the manner in which predetermined messages may be stored on a suitable storage device such as a magnetic disk and in a format for transmission in voice format, facsimile format, and/or data format is well known to those of ordinary skill in the art. Still further, the manner in which different messages may be utilized for response to a live person or an answering machine, for example, the messages being sent to a live person being longer than a typical message being sent to an answering machine.

Advantageously, embodiments of the present invention provide for efficient transmission of information from an outcalling center because a message is transmitted to a telephone apparatus which is suitable to the telephone apparatus and/or the manner in which the telephone call was answered, for example, by a live person.

Those skilled in the art recognize that further embodiments of the present invention may be made without departing from its teachings.

What is claimed is:

1. An outcalling apparatus which comprises:
   a telephone outcalling apparatus for placing a telephone call over a telephone line;
   a voice detector: (a) for receiving telephone signals from the telephone line, (b) for detecting whether the telephone call was answered by a live person, and for generating a voice identification signal;
   an answering machine detector: (a) for receiving telephone signals from the telephone line, (b) for detecting whether the telephone call was answered by an answering machine, and for generating an answering machine identification signal;
   a fax detector: (a) for receiving signals from and sending signals to the telephone line, (b) for detecting whether the telephone call was answered by a facsimile machine, and for generating a fax identification signal;
   a data set detector: (a) for receiving signals from and sending signals to the telephone line, (b) for detecting whether the telephone call was answered by a data set, and for generating a data set identification signal;
   a controller, responsive to the voice, answering machine, fax, and data set identification signals, for transmitting an identification signal to the telephone outcalling apparatus which indicates whether the telephone call was answered by a live person, an answering machine, a facsimile machine, or a data set; and
   the telephone outcalling apparatus further comprising means, responsive to the identification signal, for connecting the telephone line to: (a) a first signal producing means if the identification signal indicates that the telephone call was answered by a live person; (b) a second signal producing means if the identification signal indicates that the telephone call was answered by an answering machine; (c) a third signal producing means if the identification signal indicates that the telephone call was answered by a facsimile machine; and (d) a fourth signal producing means if the identification signal indicates that the telephone call was answered by a data set.

2. The outcalling apparatus of claim 1 wherein the first signal producing means comprises a telephone dialogue application.

3. The outcalling apparatus of claim 1 wherein the second signal producing means comprises a voice delivery system.

4. The outcalling apparatus of claim 1 wherein the third signal producing means comprises a facsimile message delivery system.

5. The outcalling apparatus of claim 1 wherein the fourth signal producing means comprises a data message delivery system.

6. The outcalling apparatus of claim 1 wherein the first signal producing means comprises a telephone apparatus which is utilized by a live person.

7. The outcalling apparatus of claim 1 wherein the first signal producing means comprises a voice message delivery system.

8. A method for outcalling which comprises the steps of:
   placing a telephone call over a telephone line;
   detecting whether the telephone call was answered by a live person and generating a voice identification signal;
   detecting whether the telephone call was answered by an answering machine and generating an answering machine identification signal;
   detecting whether the telephone call was answered by a facsimile machine and generating a fax identification signal;
   detecting whether the telephone call was answered by a data set and generating a data set identification signal;
   responsive to the voice, answering machine, fax, and data set identification signals, determining whether the telephone call was answered by a live person, an answering machine, a facsimile machine, or a data set and generating an identification signal; and
   connecting the telephone line to: (a) a first signal producing means if the identification signal indicates that the telephone call was answered by a live person; (b) a second signal producing means if the identification signal indicates that the telephone call was answered by an answering machine; (c) a third signal producing means if the identification signal indicates that the telephone call was answered by a facsimile machine; and (d) a fourth signal producing means if the identification signal indicates that the telephone call was answered by a data set.

9. A method for outcalling which comprises the steps of:
   placing a telephone call over a telephone line;
   detecting whether the telephone call was answered by an answering machine and generating an answering machine identification signal;
   detecting whether the telephone call was answered by a facsimile machine and generating a fax identification signal;
   responsive to the answering machine and fax identification signals, determining whether the telephone call was answered by an answering machine or a facsimile machine and generating an identification signal; and
   connecting the telephone line to: (a) a first signal producing means if the identification signal indicates that the telephone call was answered by an answering machine and (b) a second signal producing means if the identification signal indicates that the telephone call was answered by a facsimile machine.

10. A method for outcalling which comprises the steps of:
    placing a telephone call over a telephone line;
    detecting whether the telephone call was answered by a live person and generating a voice identification signal;
    detecting whether the telephone call was answered by a facsimile machine and generating a fax identification signal;
    responsive to the voice and fax identification signals, determining whether the telephone call was answered by a live person or a facsimile machine and generating an identification signal; and
    connecting the telephone line to: (a) a first signal producing means if the identification signal indicates that the telephone call was answered by a live person and (b) a second signal producing means if the identification signal indicates that the telephone call was answered by a facsimile machine.

11. A method for outcalling which comprises the steps of:
    placing a telephone call over a telephone line;
    detecting whether the telephone call was answered by a live person and generating a voice identification signal;
    detecting whether the telephone call was answered by an answering machine and generating an answering machine identification signal;
    detecting whether the telephone call was answered by a facsimile machine and generating a fax identification signal;
    responsive to the voice, answering machine and fax identification signals, determining whether the telephone call was answered by a live person, an answering machine, or a facsimile machine and generating an identification signal; and
    connecting the telephone line to: (a) a first signal producing means if the identification signal indicates that the telephone call was answered by a live person; (b) a second signal producing means if the identification signal indicates that the telephone call was answered by an answering machine; and (c) a third signal producing means if the identification signal indicates that the telephone call was answered by a facsimile machine.

12. A method for outcalling which comprises the steps of:
    placing a telephone call over a telephone line;
    detecting whether the telephone call was answered by a live person and generating a voice identification signal;

detecting whether the telephone call was answered by a data set and generating a data set identification signal;

responsive to the voice and data set identification signals, determining whether the telephone call was answered by a live person or a data set and generating an identification signal; and connecting the telephone line to: (a) a first signal producing means if the identification signal indicates that the telephone call was answered by a live person and (b) a second signal producing means if the identification signal indicates that the telephone call was answered by a data set.

13. A method for outcalling which comprises the steps of:

placing a telephone call over a telephone line;

detecting whether the telephone call was answered by an answering machine and generating an answering machine identification signal;

detecting whether the telephone call was answered by a data set and generating a data set identification signal;

responsive to the answering machine and data set identification signals, determining whether the telephone call was answered by an answering machine or a data set and generating an identification signal; and connecting the telephone line to: (a) a first signal producing means if the identification signal indicates that the telephone call was answered by an answering machine and (b) a second signal producing means if the identification signal indicates that the telephone call was answered by a data set.

14. A method for outcalling which comprises the steps of:

placing a telephone call over a telephone line;

detecting whether the telephone call was answered by a facsimile machine and generating a fax identification signal;

detecting whether the telephone call was answered by a data set and generating a data set identification signal;

responsive to the fax and data set identification signals, determining whether the telephone call was answered by a facsimile machine or a data set and generating an identification signal; and connecting the telephone line to: (a) a first signal producing means if the identification signal indicates that the telephone call was answered by a facsimile machine and (b) a second signal producing means if the identification signal indicates that the telephone call was answered by a data set facsimile machine.

* * * * *